US005169924A

United States Patent [19]

Asanuma et al.

[11] Patent Number: 5,169,924

[45] Date of Patent: Dec. 8, 1992

[54] COPOLYMER OF PROPYLENE AND BUTENE-1

[75] Inventors: Tadashi Asanuma, Takaishi; Tetsunosuke Shiomura, Tokyo; Tateyo Sasaki, Takaishi; Tutomu Iwatani; Nobutaka Uchikawa, both of Takaishi, all of Japan

[73] Assignee: Mitsui Toatsu Chemicals, Incorporated, Tokyo, Japan

[21] Appl. No.: 556,995

[22] Filed: Jul. 25, 1990

[30] Foreign Application Priority Data

Aug. 10, 1989 [JP] Japan .................................. 1-205787

[51] Int. Cl.$^5$ ............................................ C08F 210/06

[52] U.S. Cl. ................................. 526/348.6; 526/160; 526/348.2; 526/348.4; 526/348.5

[58] Field of Search ................... 526/160, 348.6, 348.2

[56] References Cited

U.S. PATENT DOCUMENTS 4,892,851 1/1990 Ewen et al. ..................... 526/160 X

FOREIGN PATENT DOCUMENTS 0351392 1/1990 European Pat. Off. .
2119213 5/1987 Japan .................................. 526/160

OTHER PUBLICATIONS

*Journal Of The American Chemical Society*, vol. 110, 1988, pp. 6255-6256, American Chemical Society; J. A. Ewen et al.

*Primary Examiner*—Joseph L. Schofer
*Attorney, Agent, or Firm*—Burns, Doane, Swecker & Mathis

[57] ABSTRACT

A copolymer of propylene and butene-1, the constituent monomer units of which comprise 20–63 wt. % of propylene and 37–80 wt. % of butene-1, and which exhibits 0.5 or more in the ratio of the sum of the intensities of absorptions observed at about 20.0–21.0 ppm to the sum of the intensities of total absorptions attributable to the methyl groups in the propylene units observed at about 19.0–22.0 ppm in the $^{13}$C-NMR spectrum measured in a 1,2,4-trichlorobenzene solution and 0.05 or more in the intrinsic viscosity measured at 135° C. in a tetralin solution.

2 Claims, No Drawings

COPOLYMER OF PROPYLENE AND BUTENE-1

BACKGROUND OF THE INVENTION

1. Field of the Invention

The present invention relates to a copolymer of propylene and butene. More specifically, the present invention relates to a copolymer of propylene and butene-1 which has a specific structure.

2. Description of the Prior Art

Although the existence of syndiotactic polypropylenes has been known from old days, those produced by the conventional process in which propylene is polymerized at a low temperature in the presence of a catalyst comprising a vanadium compound, an ether and an organoaluminum, are of low syndiotacticity and hence can hardly be regarded as syndiotactic polypropylenes. Copolymers of other olefins with propylene are much less regarded as crystalline polypropylenes. On the other hand, a polypropylene of good tacticity, say, a syndioactic pentad fraction of more than 0.8, has been discovered for the first time by J.A. Ewen et al. by the use of a catalyst comprising a transition metal compound having an asymmetric ligand and an aluminoxane (J. Am. Chem. Soc., 1988, 110, 6255-6256).

The above-mentioned method of J.A. Ewen et al. exhibits a high catalytic activity per unit amount of the transition metal and can provide a polymer having a high tacticity and relatively properly balanced physical properties. However, molded articles of the polymer are poor in transparency and unsatisfactory in impact resistance at low temperatures.

SUMMARY OF THE INVENTION

The present inventors have made intensive investigations into copolymers which are free from the foregoing problems and hence have well-balanced rigidity and impact resistance as well as a good transparency, leading to completion of the present invention.

The present invention provides a copolymer of propylene and butene-1, the constituent monomer units of which comprise 20-63 wt.% of propylene and 37-80 wt.% of butene-1, and which exhibits 0.5 or more in the ratio of the sum of the intensities of absorptions observed at about 20.0-21.0 ppm to the sum of the intensities of total absorptions attributable to the methyl groups in the propylene units observed at about 19.0-22.0 ppm in the $^{13}C$-NMR spectrum measured in a 1,2,4-trichlorobenzene solution and 0.05 or more in intrinsic viscosity measured at 135° C. in a tetralin solution.

The $^{13}C$-NMR spectrum is obtained by measuring on the basis of tetramethylsilane.

Molded articles made from the copolymers of the present invention are superior in transparency and impact strength to those manufactured from polypropylene copolymers prepared by using catalysts and polymerization procedures known in the art and having isotactic structures, and also to those from conventionally known syndiotactic polypropylenes. Thus, they are of great industrial value.

DESCRIPTION OF THE PREFERRED EMBODIMENTS

As an exemplary catalyst useful in the production of the copolymers of the present invention there may be mentioned the catalyst system comprising a transition metal compound having an asymmetric ligand and an aluminoxane, described in the aforesaid literature. It is also possible to use other different catalyst systems in the presence of which a homopolymer of propylene having a relatively high tacticity, for example, a syndiotactic pentad fraction of about 0.7 or more, can be produced. The syndiotactic pentad fraction is defined by A. Zambelli et al. in Macromolecules vol. 6, 687 (1973) and ibid. vol. 8, 925 (1975), the contents of which are incorporated by reference.

The exemplary preferred catalyst system for the production of the copolymer of the present invention comprises a transition metal compound having an asymmetric ligand and an aluminoxane, as described in the aforesaid literature. The transition metal compound having an asymmetric ligand includes isopropyl(cyclopentadienyl-1-fluorenyl)hafnium dihalogenide, isopropyl(cyclopentadienyl-1-fluorenyl)zirconium dihalogenide, and those transition metal compounds in which at least one of the halogen atoms is replaced by an alkyl group. As the aluminoxane may be cited compounds represented by the general formula

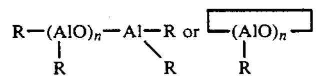

wherein R is a hydrocarbon residue of 1-3 carbon atoms. The compounds in which R is a methyl group, i.e. methylaluminoxane, and n is 5 or more, preferably 10 or more, are particularly useful. The proportion of the aluminoxane used is 10 to 1,000,000 mol times, usually 50 to 5,000 mol times based on the foregoing transition metal compound. No particular restrictions are imposed on the polymerization conditions, and hence the solvent polymerization process using inert solvents, the bulk polymerization process in the substantial absence of inert solvents and the gas phase polymerization process may be used.

It is a common practice to carry out the polymerization at a temperature of −100° to 200° C. and a pressure of atmospheric to 100 kg/cm2G. Temperatures of −100° to 100° C. and pressures of atmospheric to 50 $kg/cm^2G$ are preferred.

It is important in the present invention to control the amounts of both of the monomers introduced in the polymerization system in such a way that the proportion of the constituent monomer units of the resulting copolymer is 20-63 wt.% of propylene and 37-80 wt.% of butene-1, to control the conditions of the polymerization reaction in such a way that the ratio of the sum of the intensities of absorptions observed at about 20.0-21.0 ppm to the sum of the intensities of total absorptions attributable to the methyl groups in the propylene units observed at about 19.0-22.0 ppm may attain 0.5 or more in the $^{13}C$-NMR spectrum measured in a 1,2,4-trichlorobenzene solution of the polymer obtained, and, if necessary, to wash the obtained polymer with a solvent. There has not been known to date the above knowledge regarding the pattern of the absorption spectrum of the methyl groups, which is assumed to originate in the stereostructure of propylene, in the $^{13}C$-NMR spectrum. This characterizes the copolymers of the present invention, for example, to allow them to have excellent transparency.

If the proportion of butene-1 unit is less than 37 wt.%, the resulting copolymer will have less improved impact resistance. On the other hand, any proportion beyond 80 wt.% will result in poor transparency.

The copolymer of the present invention may also contain, if necessary, 10 mol% or less of ethylene or an α-olefin of 5–20 carbon atoms, specifically, pentene-1, hexene-1, 3-methylbutene-1, 4-methylpentene-1, octene-1, etc., as long as the resulting copolymer satisfies the above-described definition of the copolymer of the present invention.

The aforesaid requirements concerning the $^{13}$C-NMR spectrum of the copolymer can also be met by controlling the conditions of the polymerization reaction, as described above. Concretely, it is advisable to conduct the copolymerization by using a transition metal compound of the highest possible purity and at a relatively low temperature. The purity of the transition metal compound is preferably 90% or higher, depending on the activity of the impurities present, while the polymerization temperature is preferably 100° C. or below.

When the copolymer obtained by the copolymerization does not meet the above-mentioned requirements of the $^{13}$C-NMR spectrum, the copolymer should be washed with a solvent, whereby the requirements can be met. The solvent is one that can dissolve or disperse the low-molecular atactic component, and examples of the solvent include hydrocarbons having 3 to 20 carbon atoms, alcohols having 1 to 20 carbon atoms, and ethers and esters having 2 to 20 carbon atoms. Examples of these hydrocarbons include propylene itself, saturated hydrocarbons such as propane, butane, pentane, hexane, heptane, octane and nonane, aromatic hydrocarbons such as benzene, toluene, xylene and ethylbenzene, and other hydrocarbons in which a part or all of the hydrogen atoms are substituted with a halogen such as fluorine, chlorine, bromine or iodine. Examples of the alcohols include methanol, ethanol, propanol, butanol, pentanol, hexanol and benzyl alcohol. Examples of the ethers include diethyl ether, dipropyl ether, dibutyl ether, dipentyl ether, dihexyl ether and diphenyl ether, and examples of the esters include methyl acetate, ethyl acetate, propyl acetate, butyl acetate, ethyl benzoate and butyl benzoate.

Any washing technique can be used without particular restriction, so long as it permits dissolving a part of the copolymer which is soluble in the solvent and separating the soluble portion from the insoluble portion. Thus, there can be employed a conventional process of dispersing the copolymer in the solvent and then separating the soluble portion from the insoluble portion by decantation, centrifugation or filtration, or a process of using a countercurrent washing tower in which the copolymer is brought into contact with the solvent in a countercurrent way. A washing temperature can be optionally selected from temperatures which are lower than the melting point of the copolymer and at which the solvent is in the liquid state, and it is generally in the range of 0° to 100° C. Usually, the washing is carried out at ambient temperature. In one washing operation, the amount of the solvent is preferably equal to or more than the apparent volume of the copolymer. If the above-mentioned requirements of the $^{13}$C-NMR spectrum cannot be met by one washing operation, it is necessary to repeat this washing operation several times.

In the present invention, the molecular weight of the copolymer is 0.05 or more in terms of the intrinsic viscosity measured in a tetralin solution at 135° C. and about 1,000 or more as the number average molecular weight measured by gel permeation chromatography and corrected in terms of polypropylene, from the standpoint of being useful as molding resins.

The present invention will be illustrated more specifically with reference to the following examples.

EXAMPLE 1

In 1 liter of toluene in an autoclave with an inner volume of 2 liters were dissolved 5 mg of isopropyl-(cyclopentadienyl-1-fluorenyl)zirconium dichloride and 0.67 g of methylaluminoxane having a polymerization degree of about 15. Here, the isopropyl(cyclopentadienyl-1-fluoren-vl)zirconium dichloride had been obtained by introducing lithium into isopropyl cyclopentadienyl-1-fluorene synthesized in a conventional manner and then reacting the resulting compound with zirconium tetrachloride, while the methylaluminoxane had been obtained by reacting copper sulfate hexahydrate with trimethylaluminium in toluene. Propylene was charged in the autoclave up to a pressure of 3 kg/cm$^2$G at 30° C., followed by the addition of 200 g of butene-1 at the same temperature under pressure. Thus, polymerization was continued for 1 hour while constantly adding propylene to maintain the polymerization pressure at 3 kg/cm$^2$G. Following the purge of the unreacted monomers, the autoclave was opened and the contents were filtered at 25° C. by suction using an apparatus consisting of a Nutsche (Buchner funnel) and a filtration flask. Then, 1 liter of toluene was added onto the powdery copolymer on the Nutsche, followed by suction filtration. This operation was repeated 5 times at 25° C. After this washing operation, the copolymer was dried at 80° C. under reduced pressure to obtain 150 g of a powdery copolymer. According to the $^{13}$C-NMR spectrum measured in a 1,2,4-trichlorobenzene solution of the copolymer, the ratio of the sum of the intensities of absorptions measured at about 20.0–21.0 ppm was 0.98 relative to the sum of the intensities of total absorptions measured at about 19.0–22.0 ppm (strong absorptions at about 20.2 and 20.5 ppm) on the basis of tetramethylsilane. The copolymer contained 56 wt.% of constituent unit of butene-1. Further, the intrinsic viscosity (hereinafter referred to as "η") of the copolymer measured in a tetralin solution at 135° C. was 0.73, and the ratio of the weight average molecular weight to the number average molecular weight (hereinafter referred to as "MW/MN") measured in a 1,2,4-trichlorobenzene solution at 135° C. by gel permeation chromatography was 2.1. The powder was press-molded at 210° C. to form a sheet having a thickness of 1 mm, and its properties were measured as follows:

| | |
|---|---|
| Flexural stiffness (kg/cm$^2$) | ASTM D747 (23° C.) |
| Tensile yield strength (kg/cm$^2$) | ASTM D638 (23° C.) |
| Elongation (%) | ASTM D638 (23° C.) |
| Izod impact strength (kg cm/cm) (notched) | ASTM D256 (23° C., −10° C.) |
| Haze (%) | ASTM D1003 |

The flexural stiffness was 2,200 kg/cm$^2$, the tensile yield strength was 109 kg/cm$^2$, the elongation was 36%, and values of the Izod impact strength were 68.4 and 3.2 kg cm/cm (at 23° C. and −10° C., respectively), and the haze was 38%.

COMPARATIVE EXAMPLE 1

Polymerization was conducted in the same manner as in Example 1 except that no butene-1 was used, thereby obtaining a polymer, and the latter was subjected to post treatment to obtain a polymer having an $\eta$ of 1.28, a syndiotactic pentad fraction of 0.92 and an MW/MN of 2.1. This polymer was molded in the same manner as in Example 1 to obtain a sheet. Measurements of the properties of the sheet revealed that the flexural stiffness was 4,700 kg/cm$^2$, the tensile yield strength was 224 kg/cm$^2$, the elongation was 740%, values of the Izod impact strength were 14.1 and 2.1 kg cm/cm (at 23° C. and −10° C., respectively), and the haze was 68%.

EXAMPLE 2

In an autoclave having an inner volume of 5 liters was charged 800 g of propylene, to which 10 mg of isopropyl (cyclopentadienyl−1-fluorenyl)zirconium dichloride and 1.34 g of methylaluminoxane having a polymerization degree of about 15 were added at 30° C. under pressure. Then, 660 g of butene−1 was fed in under pressure and the contents were agitated for 1 hour at the same temperature for polymerization. Following the purge of the unreacted propylene, the autoclave was opened and the contents were filtered to obtain a powder. The powder was then dried at 80° C. under reduced pressure, thereby obtaining 450 g of a copolymer.

The copolymer had an $\eta$ of 0.89 and a butene−1 content of 39.4 wt.%. In the $^{13}$C-NMR spectrum, the ratio of the sum of the intensities of absorptions observed at about 20.0–21.0 ppm (roughly two absorptions were observed at about 20.2 and 20.5 ppm) to the sum of the intensities of total absorptions observed at about 19.0–21.0 ppm was 0.83, and the MW/MN was 2.1. The copolymer was molded in the same manner as in Example 1 to obtain a sheet. Measurements of the properties of the sheet revealed that the flexural stiffness was 2,500 kg/cm$^2$, the tensile yield strength was 114 kg/cm$^2$, the elongation was 393%, values of the Izod impact strength were 56.4 and 3.2 kg cm/cm (at 23° C. and −10° C., respectively), and the haze was 44%.

COMPARATIVE EXAMPLE 2

Polymerization was conducted in the same manner as in Example 2 except that no butene−1 was used, thereby obtaining a polymer, and the latter was subjected to post treatment to obtain a polymer having an $\eta$ of 1.26, a syndiotactic pentad fraction of 0.93 and an MW/MN of 2.1. The polymer was molded in the same manner as in Example 1 to obtain a sheet. Measurements of the properties of the sheet revealed that the flexural stiffness was 5,200 kg/cm$^2$, the tensile yield strength was 223 kg/cm$^2$, the elongation was 785%, values of the Izod impact strength were 18.5 and 2.7 kg cm/cm (at 23° C. and −10° C., respectively), and the haze was 62%.

COMPARATIVE EXAMPLE 3

The same procedures of polymerization and post treatment as in Example 1 were followed except that 20 mg of 1,2-ethylenebis−1,1,-indenylhafnium dichloride was used as the transition metal compound, thereby obtaining 58 g of a copolymer having an isotactic structure and composed of propylene and butene−1.

The copolymer was analyzed by $^{13}$C-NMR and found to have strong absorptions at about 19.0 ppm and about 21.3 ppm and practically no absorptions at about 20.0–21.0 ppm.

The transition metal compound used in this comparative example has a symmetric ligand. And, the catalyst system comprising this transition metal compound gives only a copolymer of an isotactic structure, but does not give a copolymer of a syndiotactic structure.

The copolymer contained 48 wt.% of butene−1 constituent unit and had an $\eta$ of 0.58 and an MW/MN of 2.0. The copolymer was press-molded in the same manner as in Example 1 to obtain a sheet and the properties of the sheet were measured. Its flexural stiffness was 850 kg/cm$^2$, but the tensile yield strength could not be measured due to no existence of yield point. Further, its values of the Izod impact strength were 54.3 and 2.8 kg cm/cm, while its haze was 48%.

This polymer having an isotactic structure was inferior in all items of flexural stiffness, impact strength and transparency compared to the copolymer obtained in Example 1, which had a syndiotactic structure and had a practically identical constituent monomer composition to the copolymer of this Comparative Example.

We claim:

1. A copolymer of propylene and butene−1, the constituent monomer units of which comprise 20–63 wt.% of propylene and 37–80 wt.% of butene−1, and which exhibits 0.5 or more in the ratio of the sum of the intensities of absorptions observed at about 20.0–21.0 ppm to the sum of the intensities of total absorptions attributable to the methyl groups in the propylene units observed at about 19.0–22.0 ppm in the $^{13}$C-NMR spectrum measured in a 1,2,4-trichlorobenzene solution and 0.05 or more in the intrinsic viscosity measured at 135° C. in a tetralin solution.

2. The copolymer of claim 1 wherein the constituent monomer units further comprise 10 mol% or less of ethylene or an $\alpha$-olefin of 5−20 carbon atoms.

* * * * *